Jan. 3, 1939.  W. W. PARKER  2,142,677
TEMPERATURE INDICATOR
Filed Oct. 30, 1935
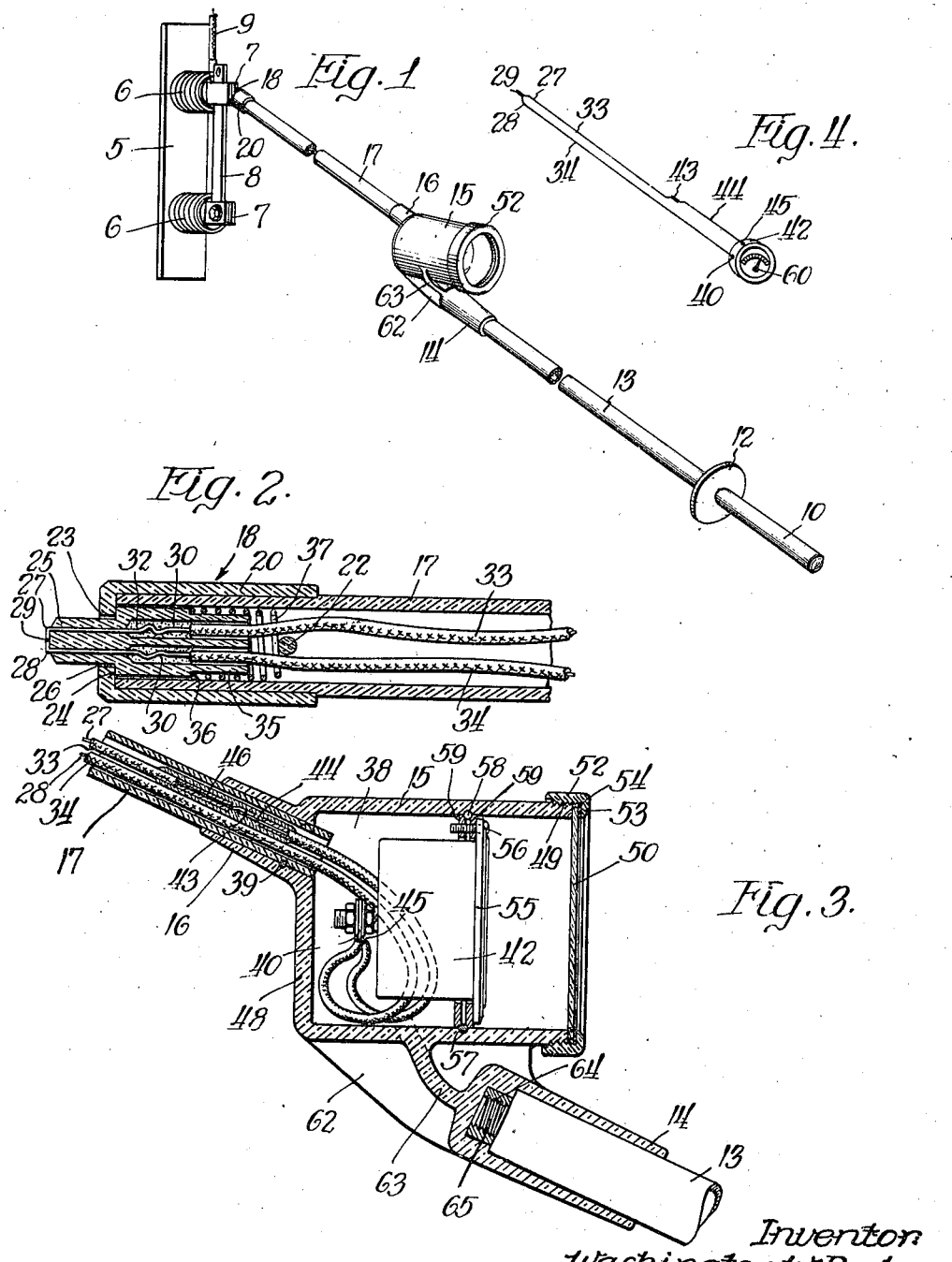
Inventor
Washington W. Parker.
By Brown Jackson Boettcher Dienner
Attys.

Patented Jan. 3, 1939

2,142,677

UNITED STATES PATENT OFFICE 2,142,677

TEMPERATURE INDICATOR

Washington W. Parker, Chicago, Ill., assignor to Schweitzer & Conrad, Inc., Chicago, Ill., a corporation of Delaware Application October 30, 1935, Serial No. 47,519

4 Claims. (Cl. 73—359)

This invention relates to temperature indicating devices and more particularly is directed to indicators of this type for measuring the temperatures on high voltage busses, switches, terminal connections of oil circuit breakers, bushings of breakers and transformers, joints and high voltage current conducting circuits, and in general for use in connection with electrical apparatus carrying high voltage current.

In the standardization of electrical equipment, the electrical engineering industry has required that the various circuit conductors and control equipment provided in power transmission and distribution systems and the like shall be of a design such that at no time will the temperature of any portion of the apparatus exceed more than a predetermined maximum with respect to the circumambient temperature. The present indicating device is adapted to facilitate quick and simple ascertainment of the temperatures of any exposed part of the apparatus, whereby a circuit or distribution system, and its associated apparatus, can be readily checked to see that it is in accordance with the requirements, and that the particular control apparatus employed is properly designed for the service expected of it.

In recent times another serious problem has arisen in connection with the power distribution and control systems operated by power companies. These companies have been making an increasingly prevalent practice of overloading the copper in circuits rather than replacing old equipment and buying and installing new or additional equipment. Many busses and connections in existing systems are now overloaded beyond their capacity, and hot spots and localized faults occur much more frequently than in the past. This condition has been further aggravated, in many instances, by a neglect of the necessary maintenance inspection and repair service. In order to determine the predominating weak spots in such systems, it has heretofore been the practice to drop the load on the circuit, install thermometers in proper contacting position with different portions of the apparatus to be tested, and then reestablish the load and wait until the thermometers have reached a constant temperature.

With the present invention, facility in the testing and determining of the temperature rise of the various portions of the apparatus is provided, without the necessity of dropping the load, and a large number of such points may be measured in a relatively short time. The device thus eliminates the use of thermometers, which are not only relatively inaccurate as usually applied, but also require the load to be dropped from the line before the thermometers can be installed in their proper position.

The present invention enables the operator to read directly the degree of temperature rise of the particular part of the apparatus being tested with respect to the surrounding ambient temperature during high voltage circuit conditions, even in circuits in which the voltage may be of the order of 25,000 volts. This reading affords an immediate indication of whether or not that portion of the apparatus being tested is within the maximum allowable limits demanded for apparatus of that design, without the necessity for further calculation. Such direct reading facilitates the taking of a large number of readings of different portions of the apparatus in a relatively short time. Its use in this manner, that is, to measure the degree of temperature rise above the surrounding ambient temperature, is obviously not limited only to the testing of high voltage electrical apparatus.

The present invention, in its preferred embodiment, comprises a thermo-couple mounted in the end of an insulated rod, with leads carried within the rod and leading to a sensitive millivoltmeter which is mounted on the rod and so insulated as to be capable of safe use with high voltages. The device includes a second insulating rod extending from the millivoltmeter housing to provide a safe and convenient means for holding and placing the instrument in operating position, and including a guarded handle portion which may be grasped by the operator.

The end of the rod in which the thermo-couple is mounted preferably includes a resiliently supported tip with a spring of definite initial bias to facilitate the setting-up of a minimum contact pressure between the thermo-couple and the object under observaton. This is desirable in order to fix the value of the small temperature gradient at the point of contact, thus contributing to greater accuracy in the temperature readings. The resiliently supported tip also allows the device to be applied to an object without slipping off the instant the pressure is relaxed to some extent.

Another feature of the present invention resides in the particular method of connecting the two insulating rods or tubes through the casing, so as to secure adequate mechanical strength without relying entirely upon the millivoltmeter casing.

A still further advantage secured by the present invention is the positioning of the instrument casing angularly with respect to the longitudinal axis of the indicating device, so that positioning of the device is expedited, and ready sighting of the instrument reading with respect to the tip of the instrument is attained.

Other objects and advantages of the present invention will appear more fully from the following detailed description, which, taken in connection with the accompanying drawing, will disclose to those skilled in the art the particular construction and operation of a prefered form of the present invention.

In the drawing:

Figure 1 is a perspective view of the temperature indicator disposed in operating position for measuring the temperature of a contact clip;

Figure 2 is a sectional view through the tip end of the instrument;

Figure 3 is a partial sectional view through the millivoltmeter casing, and the associated connections of the insulating tube; and Figure 4 is a diagrammatic view showing the circuit connections for the millivoltmeter.

Referring now to the drawing, in Figure 1 I have shown a switching apparatus comprising a base member 5 having a pair of insulators 6 mounted thereon, the insulators 6 having contact clip portions 7 adapted to have a switch blade 8 pivoted thereon for connection therebetween. Suitable leads 9 may extend from the contact clips for completing the circuit connections of the switch.

The indicating instrument comprises a handle portion 10 provided with an annularly extending guard flange 12 positioned a short distance from the end of the handle portion 10, and an insulating tube 13 extending into an angularly offset socket portion 14 of the millivoltmeter housing 15. From the opposite end of the millivoltmeter housing 15 there extends a second angularly offset socket portion 16, within which is secured a second insulating tube 17. The tube 17 extends into proximity to the particular apparatus being tested, and is provided at its end with a projecting tip portion 18 adapted to have contact engagement with the particular portion of the apparatus being tested. In this embodiment of the invention the tip 18 engages one of the contact clips 7 for ascertaining the temperature of this clip during high voltage circuit conditions.

In Figure 2 I have disclosed the particular construction of the tip and insulating rod 17. It will be noted that the rod 17, which is formed of a fibrous material or a molded phenol condensation product or the like, comprises an elongated hollow cylindrical tube which is preferably provided at its end with a reduced annular portion adapted to receive an end cap member 20. The cap member is preferably secured to the tube 17 by means of the pin 22 extending thereacross.

The cap member 20 is also formed of insulating material, and is provided with an inwardly projecting flanged portion 23 extending inwardly of the end of the tube 17. The flanged portion 23 is adapted to form a stop for an annular shoulder 24 formed upon the tip member 25, which is also preferably formed of insulating material. The tip member 25 is provided with a projecting stud portion extending outwardly through the annular opening 26 defined by the inner edge of the flanged portion 23 of the cap member 20. The projecting stud portion is adapted to carry the thermocouple conductors 27 and 28, which are preferably joined at 29 to provide a thermo-couple outwardly of the projecting end of the carrier 25.

While the thermo-couple leads 27 and 28 may be formed of any dissimilar metals which are capable, when heated at their junction, of producing an electric current, I have found that satisfactory results are obtained by making the conductor 27, for example, of chromel, while the conductor or lead 28 may be of constantan. The carrier member 25 is provided with a pair of recessed portions 30, into which the leads 27 or 28 extend, the leads being preferably distorted in a suitable manner within the recesses so as to be keyed therein by means of insulating compound 32 which may be poured into the recesses 30 after the leads have been properly positioned therein. The leads 27 and 28 are provided with suitable insulation 33 and 34, to separate the free portions of said leads extending through the tubular insulating rod 17.

In order to provide for resilient movement of the tip 25 with respect to the end cap 20 of the tube 17, the tip is provided with an annularly reduced portion 35, which forms a shoulder 36 intermediate the ends of that portion of the member which is disposed within the interior of the tube 17. A suitable spring 37 is biased between the shoulder 36 and the pin member 22, and provides for movement of the member 25 inwardly of the tube 17 against the pressure of the spring member 37. The tip 25 is normally forced into pressure engagement with the object with which it is connected for testing purposes, so that the operator will be induced to maintain the contact pressure within certain limits, defined by the initial spring force and the relatively smaller additional force required to fully deflect the spring until the carrier member 25 is stopped against the pin 22. The initial spring pressure is sufficiently high to reduce the temperature gradient at the point of contact to a small value and the additional pressure required to deflect the spring to the maximum pressure is relatively slight and does not appreciably alter said temperature gradient which has been found to vary substantially inversely with the contact pressure. Thus the temperature attained by the probing thermo-couple under any particular condition of test is rendered more accurate and the consistency of the readings is greatly improved.

Another object of providing the resiliency in the tip construction is to prevent slippage of the tip, which would be likely to occur if a rigid assembly were used and the operator relaxed the applied pressure by a slight movement of his hand.

In Figure 3 I have disclosed the particular connection of the tubes 13 and 17 to the millivoltmeter casing 15, and the manner in which the millivoltmeter is mounted within its casing.

The tube 17 projects into the socket 16, and extends inwardly into the interior portion 38 of the millivoltmeter casing 15. Preferably, the inwardly extending end of the tube 17 is provided with an annular groove, which groove is adapted to be engaged by a suitable locking pin or ball member 39 to lock the tube 17 within the boss 16 and prevent outward displacement thereof. The conductors 27 and 28, extending from the thermo-couple 29, continue through the tube 17, and the conductor 28 is directly connected, as shown at 40, to one terminal of a millivoltmeter 42, which millivoltmeter is preferably of a highly sensitive type capable of registering accurately the electromotive force produced by heating of the junction 29 of the instrument.

The conductor 27, which, as noted before, is preferably formed of chromel, is connected, as shown at 43, to a second conductor 44, which is formed on constantan and which is connected, as shown at 45, to the other terminal of the millivoltmeter 42. Any other equivalent thermocouple junction may be provided, and may be disposed in a suitable manner either in the tube 17 or the housing 15, as desired.

In the operation of this circuit, the thermocouple 29 generates an electromotive force substantially directly proportional to the temperature of the particular object under test, in this case the contact clip 7. The thermo-couple 43 generates an electromotive force proportional to the temperature of the surrounding room or atmosphere, which may be termed the circumambient temperature, inasmuch as this thermocouple is located at a sufficient distance from the object being tested to prevent any appreciable heat transfer from the tip portion 18 of the device through the thermo-couple 43. The electromotive force generated by the thermo-couple 43 is opposing the electromotive force generated by the thermo-couple 29. Thus the electromotive force at the meter terminals will be a function of the difference between these two forces, or proportional to the temperature rise, comprising the difference in temperature between the clip 7 and the surrounding room temperature. The millivoltmeter 42 may be calibrated to provide for a direct reading of this temperature rise, which will be the increase in temperature of the contact clip, for example, with reference to the surrounding temperature. Thus, if the standard requirements of contact clips of this type should be such that they should not have a temperature rise greater than thirty degrees above the ambient temperature which might be assumed to be 40° C., the electromotive force generated by the thermo-couple 29 would be such as to impress an electromotive force on the millivoltemeter corresponding to the temperature of 70° C., if no other thermo-electric junctions were present in the circuit. If the leads 27 and 28, being of dissimilar material, were attached directly to the binding posts of the meter, the meter itself contributing no electromotive force to the circuit, the two junctions formed at the binding posts would be the equivalent of a junction directly between the two wires 27 and 28 but of opposite polarity and generating an electromotive force as a function of the temperature of the binding post; thus, the electromotive force imposed on the meter would be substantially proportional to the temperature rise of the probing junction. However, owing to the relatively large bulk of the binding posts and the adjoining parts of the meter, the junctions providing the temperature level of reference would be rather sluggish in adjusting themselves to a changing ambient temperature.

For this reason the thermo-couple 43 has been included to form a reference couple at some distance from the binding posts, thereby providing a couple of reference adhering more closely to a changing ambient temperature.

As shown in Figure 3, the millivoltmeter housing 15 preferably comprises a substantially cylindrical housing having an integrally formed rear wall 48, and provided with an exteriorly threaded portion 49 adjacent the forward end of the housing. A suitable glass cover plate 50 is disposed in abutting engagement with the open end of the housing 15, and is secured in position by means of the flanged cap member 52, which has the inwardly extending beveled flange portion 53 extending over the outer periphery of the glass 50, there being a suitable gasket member 54 interposed therebetween. Threading of the cap member 52 upon the threaded end 49 of the housing 15 clamps the glass 50 in position between the end of the housing and the flanged portion 53 of the cap 52.

The housing 15 is preferably formed of a molded phenol condensation product, although it may be built up of any suitable or equivalent type of insulating material.

The millivoltmeter 42 is provided with a flanged cap member 55, having a projecting annular flange, which flange is provided, at spaced intervals about its periphery, with openings adapted to receive securing screws 56. An annular groove 57 formed in the inner surface of the cylindrical portion of the housing 15 is adapted to receive a clamping ring 58, which projects outwardly of the groove 57 into the interior of the housing. A pair of supporting annular plate members 59, or the like, are disposed upon opposite sides of the ring 58, and are provided with enlarged central openings through which the rear portion of the millivoltmeter 42 is adapted to extend. The annular supporting members 59 are threaded to receive the mounting screws 56, whereby the flange portion 55 is securely mounted upon the supporting plates 59, thereby locking the millivoltmeter casing 42 in proper position within the housing 15. This disposes the face portion of the millivoltmeter 42, shown at 60 in Figure 4, in proper position so that it may be easily read through the glass 50. The particular spacing of the millivoltmeter with respect to the front of the housing is determined by the leakage distance required in an instrument of any particular voltage rating.

The casing 15 is also provided with an extending web portion 62, which terminates in the angularly offset socket portion 14, which socket portion is also provided with integral reinforcing webs 63 extending normal to the web 62. This provides proper reinforced support of the socket portion 14 of the housing 15 with respect to the body of the housing, and the entire housing 15, with the projecting sockets 14 and 16, may thus be molded integrally from a phenol condensation product or similar insulating material.

The socket 14 is recessed to receive the extending end of the insulating tube 13, and at its inner end has a recessed portion receiving an interiorly threaded nut member 64, which nut member is secured against rotation within the recessed portion of the socket 14, and is adapted to receive the projecting threaded stud 65 carried by the end of the tube 13. Thus the tube 13 is inserted into the socket 14, and the threaded end 65 thereof is threaded into the retaining nut 64, preferably molded integrally with the socket 14, whereby the tube or rod 13 is fixedly secured with respect to the housing 15, and extends in the opposite direction in parallel axial alinement with respect to the tube 17.

As previously set forth, the tube 13 is of insulating material, and is provided with a handle portion 10, there being the annular guard flange 12 interposed therebetween for preventing the operator from grasping the instrument close to the casing 15, whereby he might not be properly insulated from the high voltage currents passing through the apparatus being tested.

By the angular disposition of the axis of the casing 15 with respect to the longitudinal axis of the tubes 13 and 17, facility in reading the instrument face 60 of the millivoltmeter 42 through the glass 50 is provided, since the operator may sight the point 18 of the instrument upon the portion of the apparatus being tested, and in his direct line of vision will appear the reading upon the instrument face 60 of the millivoltmeter through the glass 50, inasmuch as the glass is angularly offset with respect to the longitudinal axes of the members 13 and 17. Further, this provides for reading of the instrument without interference from the guard flange 12.

It is to be understood that the tube 17 need not be a straight longitudinally extending tube, but may be provided with a normally extending portion, whereby portions of apparatus accessible only by vertical insertion of the contacting thermocouple tip may be accurately tested, merely by vertical movement of the normally extending portion of the tube 17 when such modified form of tube is provided. Further, if desired, the thermocouple junction 43 may be ventilated by means of suitable perforations in the casing 15 or the tube 17, or in any other equivalent manner, so as to insure that it remains at normal ambient temperature.

While I have shown and described only a preferred embodiment of the present invention, it is to be understood that various changes and modifications may be made without departing from the underlying principles of the invention. For example, the millivoltmeter casing 15 may have its axis disposed in parallel alinement with the axes of the tubes 13 and 17, if desired for particular purposes, without departing from the scope of the present invention. I therefore do not intend to be limited to the particular structure disclosed, but only insofar as defined by the scope and spirit of the appended claims.

I claim:

1. Apparatus for measuring the temperature of electrically energized members comprising, in combination, an insulating tube, a handle member, an instrument housing supported between adjacent ends of said tube and handle member, an instrument in said housing, a tip having telescoping engagement with the opposite end of said tube and resiliently supported therein, a thermocouple junction carried by said tip, and conductors leading from said junction to said instrument and carried within said tube.

2. Apparatus for measuring the temperature of electrically energized members comprising, in combination, a pair of insulating tubes, an insulating housing, said tubes extending outwardly of said housing in opposite directions, a tip resiliently and slidably supported in the outer end of one of said tubes, a thermo-couple junction carried by said tip, an instrument in said housing, a second thermo-couple junction thermally remote from said first junction and said housing, and conductors connecting said thermocouple junctions to said instrument.

3. Apparatus for measuring the temperature of electrically energized members comprising, in combination, an insulating instrument housing having a socket, an insulating tube extending into said socket, a tip member slidably mounted in the outer end of said tube, spring means normally urging said tip outwardly of said tube, an instrument in said housing, a thermo-electric circuit leading from said instrument through said tube to said tip, and an exposed thermo-couple junction at the outer end of the tip.

4. A hot-junction mounting for a high tension circuit temperature indicating device including an insulating tube having a radially inwardly extending flange at the end thereof, a tip having a radial shoulder engaging said flange for limiting outward movement of said tip, and a projecting portion of reduced diameter, a spring biased between said tube and the inner end of said tip, and a thermo-couple carried by said tip having a junction beyond the outer face of said tip and having circuit connections extending away from the tip longitudinally within said tube.

WASHINGTON W. PARKER.